(12) United States Patent
Wen et al.

(10) Patent No.: US 12,475,935 B2
(45) Date of Patent: Nov. 18, 2025

(54) MEMORY SYSTEM AND OPERATING METHOD OF THE SAME

(71) Applicants: Taiwan Semiconductor Manufacturing Company, Ltd., Hsinchu (TW); NATIONAL TSING HUA UNIVERSITY, Hsinchu (TW)

(72) Inventors: Tai-Hao Wen, New Taipei (TW); Meng-Fan Chang, Taichung (TW); Win-San Khwa, Taipei (TW)

(73) Assignees: TAIWAN SEMICONDUCTOR MANUFACTURING COMPANY, LTD., Hsinchu (TW); NATIONAL TSING HUA UNIVERSITY, Hsinchu (TW)

( * ) Notice: Subject to any disclaimer, the term of this patent is extended or adjusted under 35 U.S.C. 154(b) by 218 days.

(21) Appl. No.: 18/329,557

(22) Filed: Jun. 5, 2023

(65) Prior Publication Data

US 2024/0282349 A1 Aug. 22, 2024

Related U.S. Application Data

(60) Provisional application No. 63/446,360, filed on Feb. 17, 2023.

(51) Int. Cl.
*G11C 7/10* (2006.01)
*G06F 7/501* (2006.01)
*G06F 7/544* (2006.01)
*G11C 7/12* (2006.01)

(52) U.S. Cl.
CPC ............ *G11C 7/1069* (2013.01); *G06F 7/501* (2013.01); *G06F 7/5443* (2013.01); *G11C 7/1012* (2013.01); *G11C 7/12* (2013.01)

(58) Field of Classification Search
CPC ........ G11C 7/1069; G11C 7/1012; G11C 7/12
See application file for complete search history.

(56) References Cited

U.S. PATENT DOCUMENTS

2020/0057561 A1* 2/2020 Lai .......................... G06F 3/061
2020/0160165 A1* 5/2020 Sarin ...................... G06N 3/065
2020/0364577 A1* 11/2020 Le Gallo-Bourdeau ..................... G06N 3/084

* cited by examiner

*Primary Examiner* — Han Yang
(74) *Attorney, Agent, or Firm* — Maschoff Brennan

(57) ABSTRACT

A memory system and operating method for controlling the same are provided. The memory system includes a memory array and a control circuit. The memory array comprising a first memory block and a second memory block, wherein the first memory block has a longer endurance than the second memory block. The control circuit is configured to receive a neural network model having a plurality of weight data; divide each of the plurality of weight data into a first data segment and a second data segment, wherein the first data segment has a higher bit order than the second data segment; and program the plurality of first data segments on the first memory block and program the plurality of second data segments on the second memory block.

20 Claims, 13 Drawing Sheets

| | | Weight Data W[7:0] | | | | | | |
|---|---|---|---|---|---|---|---|---|
| | W[7] (MSB) | W[6] | W[5] | W[4] | W[3] | W[2] | W[1] | W[0] (LSB) |
| M1 | NVM-MLC | NVM-MLC | NVM-MLC | NVM-MLC | NVM-MLC | NVM-MLC | NVM-MLC | NVM-MLC |
| M2 | NVM-SLC | NVM-SLC | NVM-MLC | NVM-MLC | NVM-MLC | NVM-MLC | NVM-MLC | NVM-MLC |
| M3 | NVM-SLC | NVM-SLC | NVM-SLC | NVM-SLC | NVM-MLC | NVM-MLC | NVM-MLC | NVM-MLC |
| M4 | NVM-SLC | NVM-SLC | NVM-SLC | NVM-SLC | NVM-SLC | NVM-SLC | NVM-SLC | NVM-SLC |
| M5 | SRAM | SRAM | NVM-SLC | NVM-SLC | NVM-SLC | NVM-SLC | NVM-MLC | NVM-MLC |
| M6 | SRAM | SRAM | NVM-SLC | NVM-SLC | NVM-MLC | NVM-MLC | NVM-MLC | NVM-MLC |
| M7 | SRAM | SRAM | SRAM | SRAM | NVM-SLC | NVM-SLC | NVM-SLC | NVM-SLC |
| M8 | SRAM | SRAM | SRAM | SRAM | SRAM | SRAM | SRAM | SRAM |

| | Weight Data W[7:0] | | | | | | | |
|---|---|---|---|---|---|---|---|---|
| | W[7] (MSB) | W[6] | W[5] | W[4] | W[3] | W[2] | W[1] | W[0] (LSB) |
| M1 | NVM-MLC | NVM-MLC | NVM-MLC | NVM-MLC | NVM-MLC | NVM-MLC | NVM-MLC | NVM-MLC |
| M2 | NVM-SLC | NVM-MLC | NVM-MLC | NVM-MLC | NVM-MLC | NVM-MLC | NVM-MLC | NVM-MLC |
| M3 | NVM-SLC | NVM-SLC | NVM-SLC | NVM-SLC | NVM-MLC | NVM-MLC | NVM-MLC | NVM-MLC |
| M4 | NVM-SLC | NVM-SLC | NVM-SLC | NVM-SLC | NVM-SLC | NVM-SLC | NVM-SLC | NVM-MLC |
| M5 | SRAM | SRAM | NVM-SLC | NVM-SLC | NVM-SLC | NVM-SLC | NVM-MLC | NVM-MLC |
| M6 | SRAM | SRAM | NVM-SLC | NVM-SLC | NVM-SLC | NVM-SLC | NVM-MLC | NVM-MLC |
| M7 | SRAM | SRAM | SRAM | SRAM | NVM-SLC | NVM-SLC | NVM-SLC | NVM-SLC |
| M8 | SRAM | SRAM | SRAM | SRAM | SRAM | SRAM | SRAM | SRAM |

FIG. 4

MEMORY SYSTEM AND OPERATING METHOD OF THE SAME

CROSS-REFERENCE TO RELATED APPLICATION(S)

This application claims priority to U.S. Provisional Application No. 63/446,360 entitled "MEMORY DEVICE" filed on Feb. 17, 2023, of which the entire disclosure is hereby incorporated by reference in its entirety.

BACKGROUND

As the artificial intelligence evolves and advances, the memory architecture for performing a computing-in-memory (CiM) operation has drawn enormous attention from the field.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 illustrates a table showing various modes of how the weight data is stored in the memory array in accordance with some embodiments.

DESCRIPTION OF THE EMBODIMENTS

Figure 1:
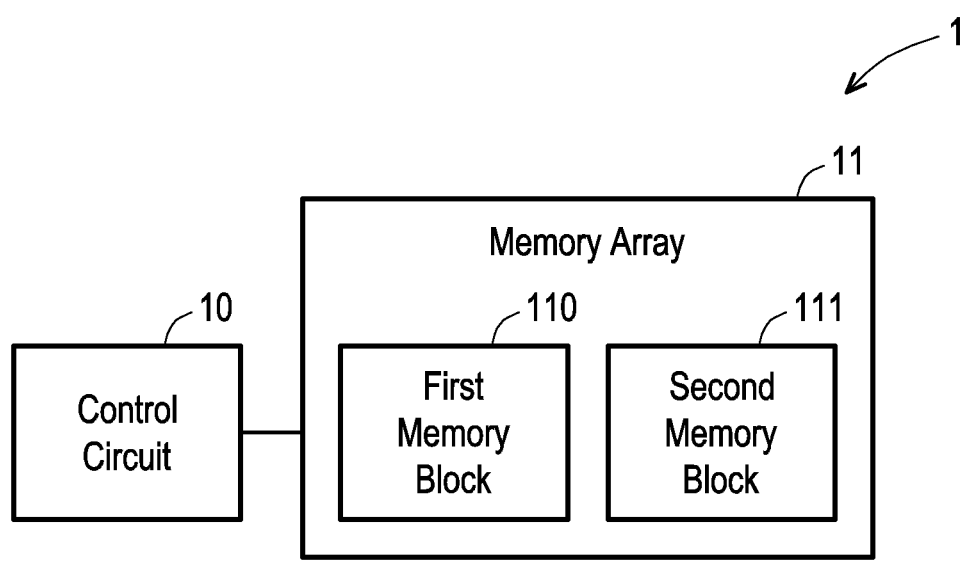
FIG. 1 illustrates a schematic diagram of a memory system in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In machine learning, a convolutional neural network (CNN, or ConvNet) is a class of deep, feed-forward artificial neural network that have successfully been applied to analyzing visual imagery or other data. CNNs use a variation of multilayer perceptrons designed to require minimal preprocessing. They are also known as shift invariant or space invariant artificial neural networks (SIANN), based on their shared-weights architecture and translation invariance characteristics. CNNs use relatively little pre-processing compared to other image classification algorithms. This means that the network learns the filters that in traditional algorithms were hand-engineered. This independence from prior knowledge and human effort in feature design is a major advantage.

In machine learning, support vector machines (SVMs, also support vector networks) are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall. In addition to performing linear classification, SVMs can efficiently perform a non-linear classification using what is called the kernel trick, implicitly mapping their inputs into high-dimensional feature spaces. When data are not labeled, supervised learning is not possible, and an unsupervised learning approach is required, which attempts to find natural clustering of the data to groups, and then map new data to these formed groups. The clustering algorithm which provides an improvement to the support vector machines is called support vector clustering and is used when data are not labeled or when only some data are labeled as a preprocessing for a classification pass.

Deep learning (also known as deep structured learning or hierarchical learning) is the application of artificial neural networks (ANNs) to learning tasks that contain more than one hidden layer. Deep learning is part of a broader family of machine learning methods based on learning data representations, as opposed to task-specific algorithms. Learning can be supervised, partially supervised or unsupervised. Some representations are loosely based on interpretation of information processing and communication patterns in a biological nervous system, such as neural coding that attempts to define a relationship between various stimuli and associated neuronal responses in the brain.

The learning algorithms may be implemented through neural network-based architectures for computation. The architectures are stored with a model comprising a plurality of weights which are capable to be trained and adapted through learning and verification processes. The trained model may be implemented on image recognition, voice recognition, or other suitable fields to determine whether one of a plurality of predetermined contents is appeared in the image or audio clip. The model may be formed by weight values of random numbers initially, and a training dataset comprising a plurality of data respectively each labeled by a corresponding class may be provided to the model. Each training data may contain, for example, image and/or audio contents to be identified by the model, and each labeled class may be referred as an answer to each training data. When the training data is provided to the model, the neural network performs calculations based on the weights stored in the model and features extracted from the training data to generate a corresponding output. Then, the generated output and the labeled class corresponding to the same training data may be compared to verify whether the computation result is consistent with the labeled class. When it is determined that there is error between the generated output and the labeled class, the weights stored in each model may be adjusted accordingly. In some embodiments, the model is initially stored with weight values of random numbers, and as learning proceeds, the model and the weights stored may be adapted, so error between the output generated by the neural network and the labeled class may be minimized.

FIG. 1 illustrates a schematic diagram of a memory system 1 in accordance with some embodiments. The memory system 1 includes a control circuit 10 and a memory array 11. The memory array 11 includes a first memory block 110 and a second memory block 111. Generally speaking, the memory system 1 is configured to store a neural network model in the memory array 11, such that a computing-in-memory (CiM) operation may be performed by the memory array 11 when a plurality of input data are provided.

Particularly, the control circuit 10 is configured to receive a plurality of weight data which constitutes the neural network model. The control circuit 10 divides each of the weight data into a first data segment and a second data segment, where the first data segment has a higher bit order than the second data segment. Then, the first data segments and the second data segments are respectively stored in the first memory block 110 and the second memory block 111 for enabling the CiM operation to be carried out by the memory array 11. The first memory block 110 and the second memory block 111 are memories of different lengths of lifetime. The first memory block 110 has a longer lifetime than the second memory block 111. For example, the first memory block 110 may be a static random-access memory (SRAM) and the second memory block 111 may be a non-volatile memory (NVM), such that the first memory block 110 has a longer endurance than the second memory block 111. In other words, the memory system 1 is configured to store the first data segment with the higher bit order in the first memory block 110, and store the second data segment with the lower bit order in the second memory block 111 for performing inferences of the neural network model.

Figure 2:
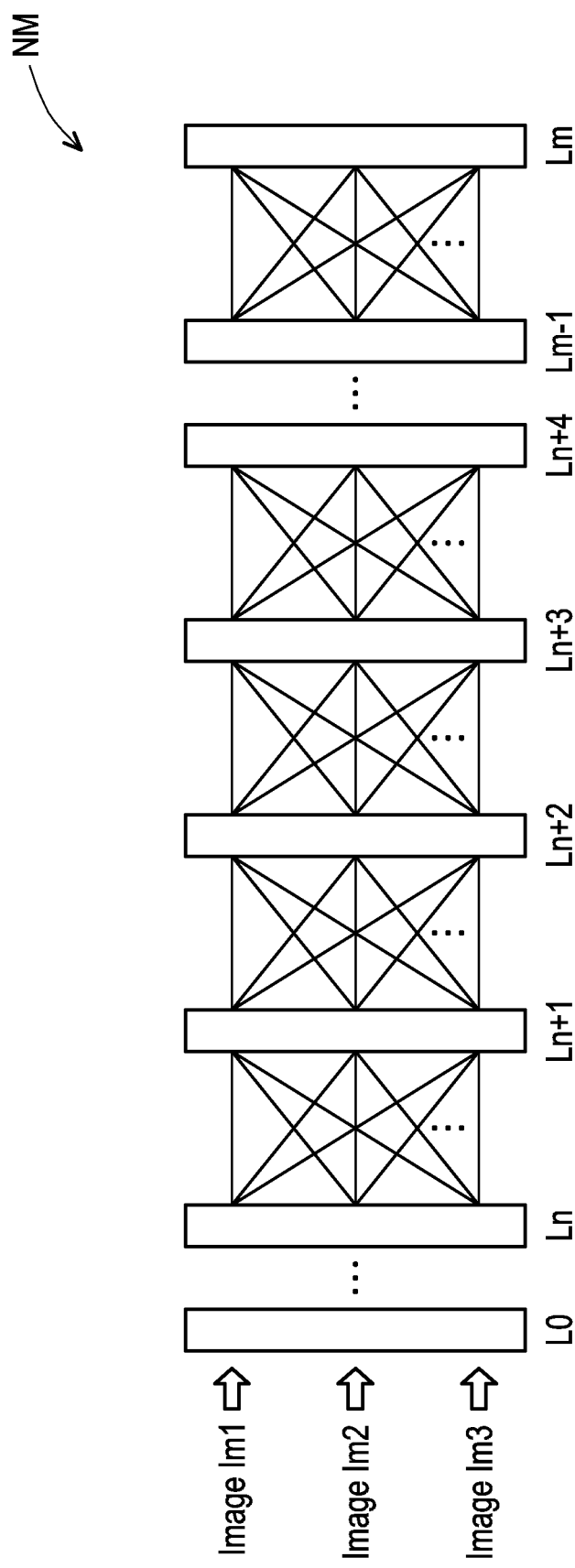
FIG. 2 illustrates a neural network model in accordance with some embodiments.

FIG. 2 illustrates a neural network model NM in accordance with some embodiments. Usually, the neural network model NM is trained by a plurality of input datasets with known classification labels, such that the neural network model NM is capable of identifying whether input data received conforms to any type of predetermined classification. Particularly, the neural network NM is a multi-layer structure, which comprises an input layer L0, multiple hidden layers L1-Lm−1, and a fully connected layer Lm. Each layer includes multiple neurons coupled to neurons of adjacent layers, and each connection between two neurons corresponds to multiplication of a weight value and is represented as a solid line in FIG. 2. Particularly, each neuron is configured to calculate and generate an output value. The generated output values are respectively multiplied by the corresponding weight values, and summed in the neurons next layer. As the calculation propagates to the fully connected layer Lm, an output result may be generated by the neural network model NM corresponding to the classification result. By properly training the neural network model NM constituted by the weight values, input data inputted to the neural network model NM may be accurately classified. For example, the neural network model NM is configured to receive the input images Im1-Im3 and generate the output results on identifying whether each of the images Im1-Im3 contains any type of predetermined objects.

Figure 3:
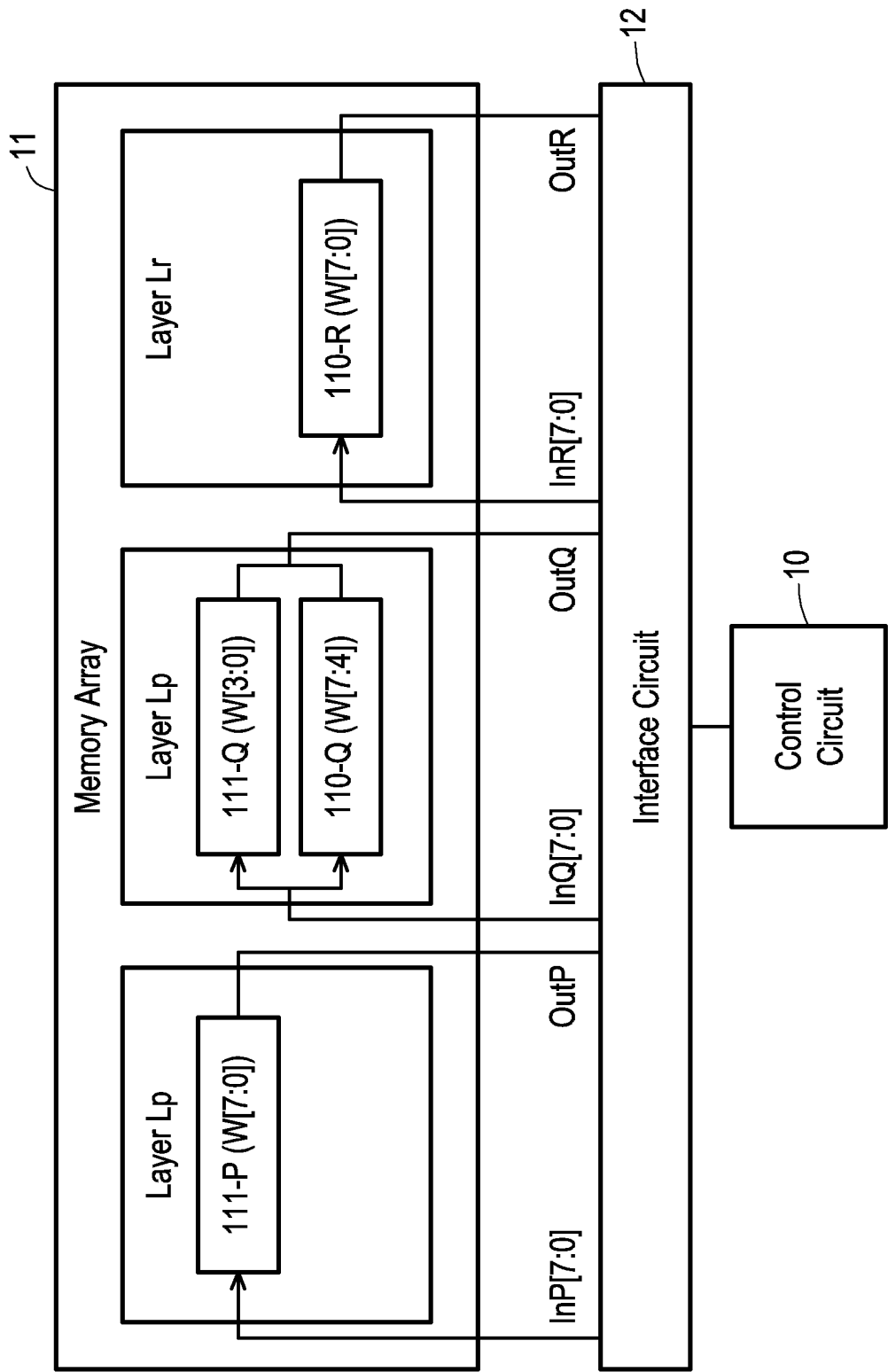
FIG. 3 illustrates arrangements of how the weight data are stored in the memory system in accordance with some embodiments.

FIG. 3 illustrates arrangements of how the weight data are stored in the memory system 1 in accordance with some embodiments. In such embodiment, the lengths of the first data segments and the second data segments are configurable and determined by the control circuit 10. Particularly, the control circuit 10 not only divides the weight data into the first data segments and the second data segments, but also the control circuit 10 configures the lengths of the first data segment and the second data segment. For example, each layer in the neural network model NM may be configured with a proper weight data arrangement in the memory array 11. As a non-limiting exemplary embodiment, three layers Lp, Lq, Lr of the neural network model NM with various weight data arrangements are illustrated in FIG. 3.

In the layer Lp, all eight bits of the weight data are stored by the second memory block 111-P. In the layer Lq, the weight data are divided to the first data segments W[7:4] and the second data segments W[3:0], and respectively stored in the first memory block 110-Q and the second memory block 111-Q. In the layer Lr, all eight bits of the weight data are stored by the first memory block 110-R. As such, the memory system 1 is capable of flexibly arranging the weight data in the memory blocks 110, 111 as long as the most significant bit (MSB) of the weight data is stored in the first memory block 110 when the weight data is divided and stored in both of the memory blocks 110, 111.

To adjustably divide the weight data and store the divided segments of the weight data in different memory blocks, an interface circuit 12 is disposed between the memory array 11 and the control circuit 10. The interface circuit 12 is configured to select the first memory block 110 and the second memory block 111 with sizes respectively corresponding to the lengths of the first and second data segments from the memory array 11. In some embodiments, the interface circuit 12 includes switches coupled to all memory cells in the first and second memory blocks 110, 111, and the switches may be controlled by a configuration signal provided from the control circuit 10 indicating lengths of the first and second data segments, and thus the interface circuit 12 may accordingly manage signal paths from the control circuit 10 to each memory cell in the first and second memory block 110, 111. Therefore, proper sizes of the first and second memory blocks 110, 112 may be coupled and selected by the interface circuit 12, so the memory system 1 is capable of flexibly arranging lengths of the first and second data segments to be stored in the first and second memory blocks 110, 111.

FIG. 4 illustrates a table 40 showing various modes of how the weight data is stored in the memory array 11 in accordance with some embodiments. In FIG. 4, total eight modes M1-M8 are illustrated in the table 40. In the modes M1-M4, the weight data W[7:0] is stored in the second memory block 111 (e.g., NVM). In the modes M5-M7, the weight data W[7:0] is divided to the first and second data segments and respectively stored in the first and second memory blocks 110, 111 (e.g., SRAM and NVM). In the modes M8, the weight data W[7:0] is stored in the first memory block 110 (e.g., SRAM).

Particularly, when the second memory block 111 is the NVM, the memory block 111 may include a plurality of memory cell to store data written in. The memory cell may comprise at least one memory element. Electrical characteristics (e.g., resistance or threshold voltage) of each memory element can be programed in different levels. Therefore, the memory cell is capable of storing data by programming electrical characteristics of the memory element into a corresponding level. In some embodiments, the memory cell in the second memory block 111-M1 is a single level cell (SLC), a multi-level cell (MLC), a tri-level cell (TLC) a quadra-level cell (QLC), or the like. In some embodiments, the memory block 111 comprising a plurality of described memory cells is configured as an SLC or an MLC or TLC or QLC memory for storing data. In one or more embodiments, the SLC or the MLC or TLC or QLC memory is further configured for computing-in-memory (CiM). In at least one embodiment, it is possible to achieve one or more advantages including, but not limited to, larger memory window, better computation performance, or the like.

In the mode M1, all bits of the weight data W[7:0] are stored by MLCs of the second memory block 111. In the modes M2, M3, bits of the weight data W[7:0] are stored by the SLCs and the MLCs of the second memory block 111. Since the SLCs have longer endurances the MLCs, the bits with higher bit order in the weight data W[7:0] are stored by the SLCs, and the bits with lower bit order in the weight data W[7:0] are stored by the MLCs. In the mode M4, all bits of the weight data W[7:0] are stored by the SLCs of the second memory block 111. In the modes M5-M7, the weight data W[7:0] is divided to the first and second data segments and respectively stored in the first and second memory blocks 110, 111. More particularly, the bits with higher bit order are stored by the first memory block 110, and the bits with lower bit order are stored by the second memory block 111. Particularly, the second memory block 111 may includes both the SLCs and the MLCs and store rest of the weight data W[7:0] in a way similar to how the weight data W[7:0] is stored in the modes M2, M3. Specifically, the bits W[5:2] and the bits W[1:0] are respectively stored by the SLCs and the MLCs in the mode M5, and the bits W[5:4] and the bits W[3:0] are respectively stored by the SLCs and the MLCs in the mode M6. In the mode M8, all bits of the weight data are stored by the first memory block 110. It should be understood that these eight modes M1-M8 in FIG. 4 are, of course, merely examples and are not intended to be limiting. Other arrangements of storing the weight data in the memories having different endurances are also within the scope of various embodiments as long as bits of the higher bit order are stored by the memory with longer endurance.

Figure 5B:
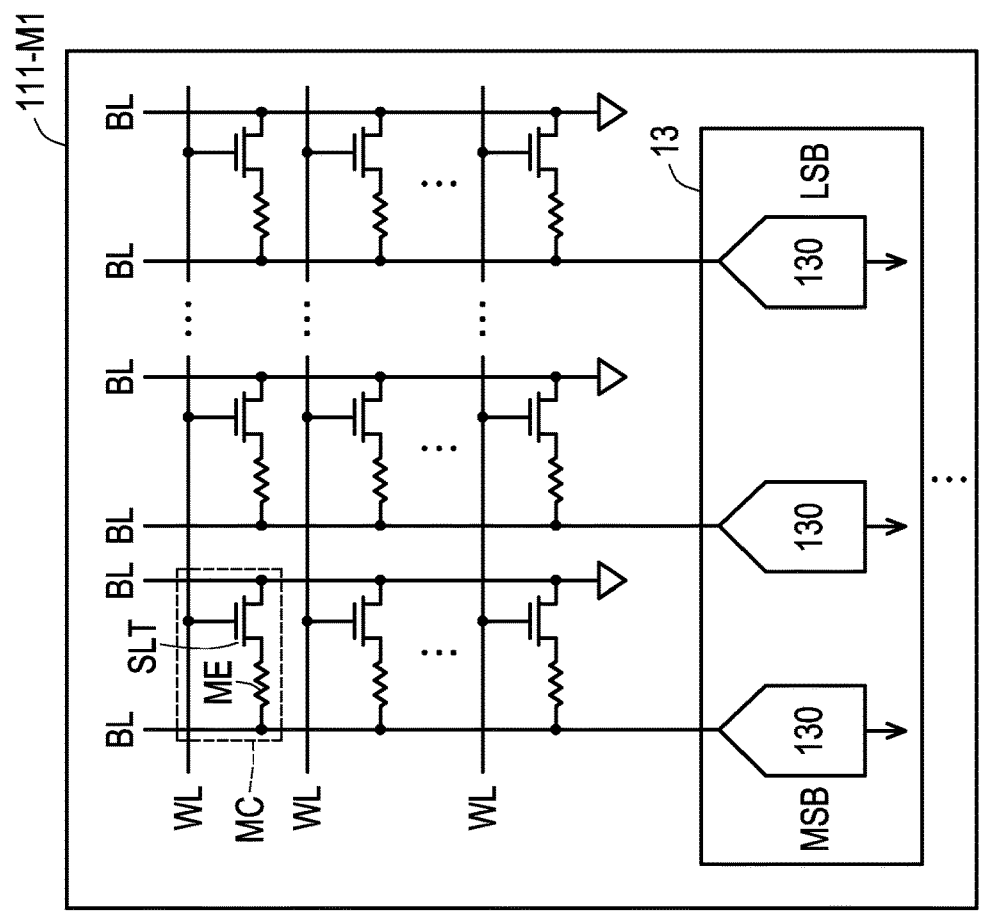
FIG. 5B illustrates a schematic diagram of the second memory block and the readout circuit in FIG. 5A in accordance with some embodiments.
Figure 5A:
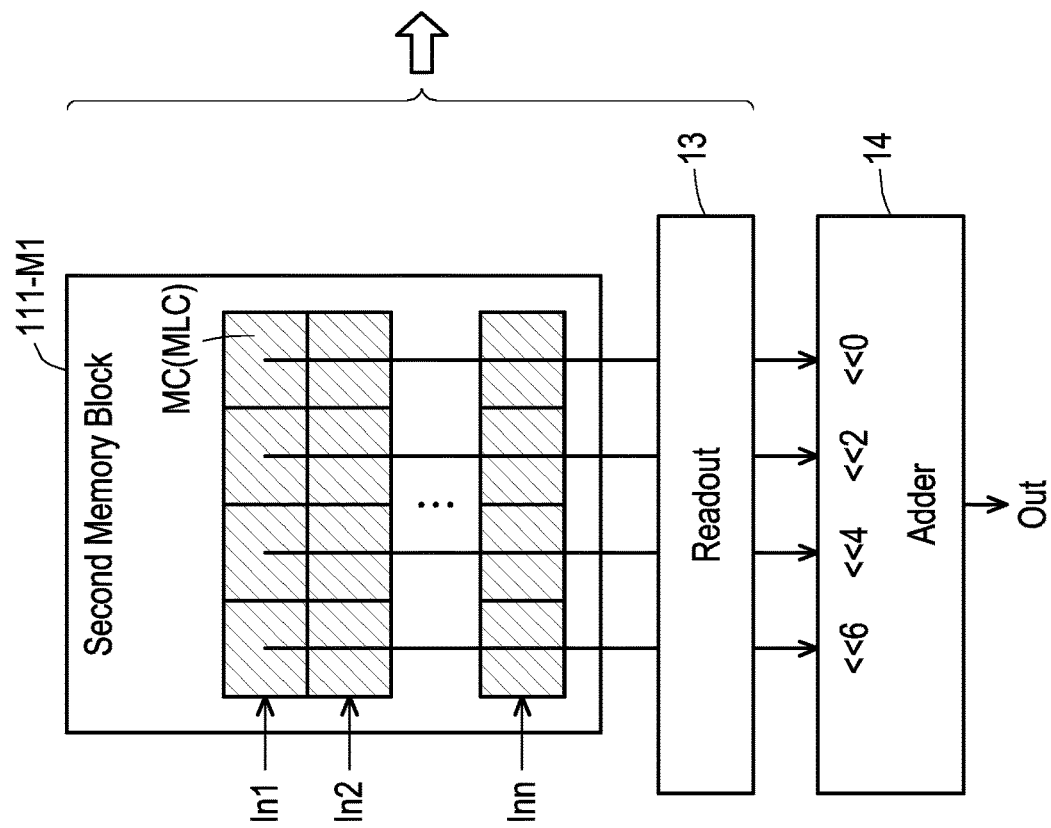
FIG. 5A illustrates a memory configuration to the second memory block when the memory system is operated in the mode M1 in FIG. 4 in accordance with some embodiments.

FIG. 5A illustrates a memory configuration to the second memory block 111-M1 when the memory system 1 is operated in the mode M1 in FIG. 4 in accordance with some embodiments. In FIG. 5A, a second memory block 111-M1, a readout circuit 13, and an adder 14 are included in the memory system 1. The second memory block 111-M1, the readout circuit 13, and the adder 14 together are configured to calculate a sum of products of the weight data respectively multiplied by the input data In1-Inn.

Particularly, the second memory block 111-M1 comprises a plurality of memory cells of MLCs arranged in rows and columns. Each row in the second memory block 111-M1 in FIG. 4 corresponds to a weight data, and the weight data each having eight bits may be stored by four columns of the memory cells MC. The input data In1-Inn are inputted to the second memory array block 111-M1 to calculate a sum of products of the weight data respectively multiplied by the input data. In some embodiments, the inputted data In1-Inn carry data of a single bit, so the memory system 1 may calculate the MAC result of the plurality of weight data respectively multiplied by the input data In1-Inn. In some embodiments, when the input data includes multiple bits, the input data may be inputted to the second memory block 111-M2 bit by bit, and the MAC result of each bit of the input data may be accumulated by proper bit shift. The multiplication of the input data and weight data are performed through controlling each MLC by the corresponding input data, so the product is provided by each MLC and summed on the bit line, which is coupled to the MLCs storing bits of the weight data in the same bit location. The electrical characteristics summed on the bit line are read by the readout circuit 13 to generate the plurality of second product segments. Further, the second product segments generated by the readout circuit 13 are added by the adder 14 with proper bit shift according to bit locations of each second product segments. Since most multiplication and accumulation (MAC) operations are performed by the memory cells and added on the bit line, the calculation is executed inside the second memory block 111-M1, and thus the CiM operation is realized.

In some embodiments, the MLCs in the second memory array 111-M1 illustrated in FIG. 5A corresponds to a block diagram of circuits of a single neuron which calculates a sum of the plurality of input data respectively multiplied by the plurality of weight data. However, the structure of a single neuron in FIG. 5A is only for exemplary purposes, and the second memory array 111-M1 of course may include more neurons to form a structure of a hidden layer, which is also within the scope of various embodiments.

FIG. 5B illustrates a schematic diagram of the second memory block 111-M1 and the readout circuit 13 in FIG. 5A in accordance with some embodiments. The second memory block 111-M1 includes a plurality of memory cells MCs arranged in rows and columns. Each memory cell MC is an MLC capable of storing two bits of the weight data.

The second memory block 111-M1 comprises a plurality of word lines WL, a plurality of source lines SL, and a plurality of bit lines BL extending along the columns of the second memory block 111-M1. Each memory cell MC is coupled to the readout circuit 13 by a corresponding bit line BL, and an input data is provided to the memory cell MC through a corresponding word line WL. The word lines WL are configured for transmitting an address of memory cells MC to be read from, and/or to be written to, or the like. The word lines WL are sometimes referred to as "address lines." In such embodiment, the word lines WL are configured to transmitting input data to the memory cells MC for controlling the memory cells to be turned on (conductive) or off (non-conductive). The bit lines BL and/or the source lines SL are configured for transmitting data to be written to, and/or read from, the memory cells MC, or memory elements ME in the memory cell MC, indicated by the addresses on the corresponding word lines WL, or the like. The bit lines BL are and/or the source lines SL sometimes referred to as "data lines." Various numbers of word lines WL and/or bit lines BL and/or source lines SL in the second memory block 111-M1 are within the scope of various embodiments.

Each memory cell MC includes a memory element ME and a selector SLT serially coupled between a corresponding bit line BL and a corresponding source line SL. The selector SLT is controlled by a corresponding word line WL, to be either turned on (conductive) or off (non-conductive). When the selector SLT is turned on, the memory element ME is coupled between corresponding word line WL and the corresponding source line SL, letting an electrical characteristic of the memory element ME programmed according to the written data to be provided on the bit line BL. For example, the electrical characteristic, such as a current, or a resistance, or a conductance, of the memory cell MC may be provided to the bit line BL. Examples of memory elements ME, which are programmable to have different electrical characteristic values, include, but are not limited to, non-volatile memories, such as resistive random-access memory (ReRAM or RRAM), magnetic RAM (MRAM), phase change memory (PCM), flash memory comprising charge storage material or floating gate, or the like. Other types or configurations of memory elements are also within the scopes of various embodiments.

When the conducted memory cell MC provides, for example, a current at a level corresponding to the programmed weight data to the bit line BL, the currents provided by all memory cells MC on the same bit line BL are summed and received by the readout circuit 13. The readout circuit 13 includes a plurality of analog-to-digital converters (ADCs) 130 respectively coupled to the bit lines BL. Each ADC 130 identifies the level of the received current from each bit line BL to generate the second product segments respectively corresponding to the currents received from the bit lines BL. Each ADC 130 is configured to convert the analog current level on each bit line BL into a digital signal as the second product segment. The readout circuit 13 provides the second product segments to the adder 14 to calculate the sum of products. Specifically, please refer to FIG. 5A, since the second product segments respectively corresponds to the sum of products of the memory cells on the plurality of bit lines BL, the bit location of each second product segment corresponds to the bit location of the weight data stored by the memory cells MC coupled on the corresponding bit line BL. For example, the second product segment received from the right most bit line BL corresponds to the sum of products of the bits W[1:0] of the weigh data, so no left shift is needed. The second product segment received from the second bit line BL from the right-hand side corresponds to the sum of products of bits W[3:2] of the weight data, so the second product segment corresponding to such bit line BL requires to be left shifted by 2 bits. Similarly, the remaining second product segments correspond to the third and fourth bit lines BL respectively requires to be left shifted by 4 and 6 bits. Consequently, all the second product segments properly shifted may added by the adder 14 to generate a MAC result of the input data respectively multiplied by the weight data.

In some embodiments, the CiM operation may also be realized in a voltage manner through calculating according to the voltage on the bit line BL. For example, in order to calculate by the voltage on the bit line BL, the voltage on the bit line BL may be precharged to a predefined voltage level. During computation, each memory cell MC is either turned on or cutoff according to a corresponding input data received, such that each turned on memory cell may cause a discharge current, corresponding to the stored weight data, from the bit line BL to ground. As a result, the MAC result may be obtained by reading out by an analog to digital converter to see how much the voltage is dropped from the precharged voltage level on the bit line BL.

In FIGS. 5A and 5B, the schematic diagram of a single neuron of the memory system 1 and how the MAC operation is performed are described. However, a skilled person may modify or duplicate the schematic diagram of the second memory block 111-M1 to realize the structures of one or more hidden layers of the neural network model NM.

Figure 6:
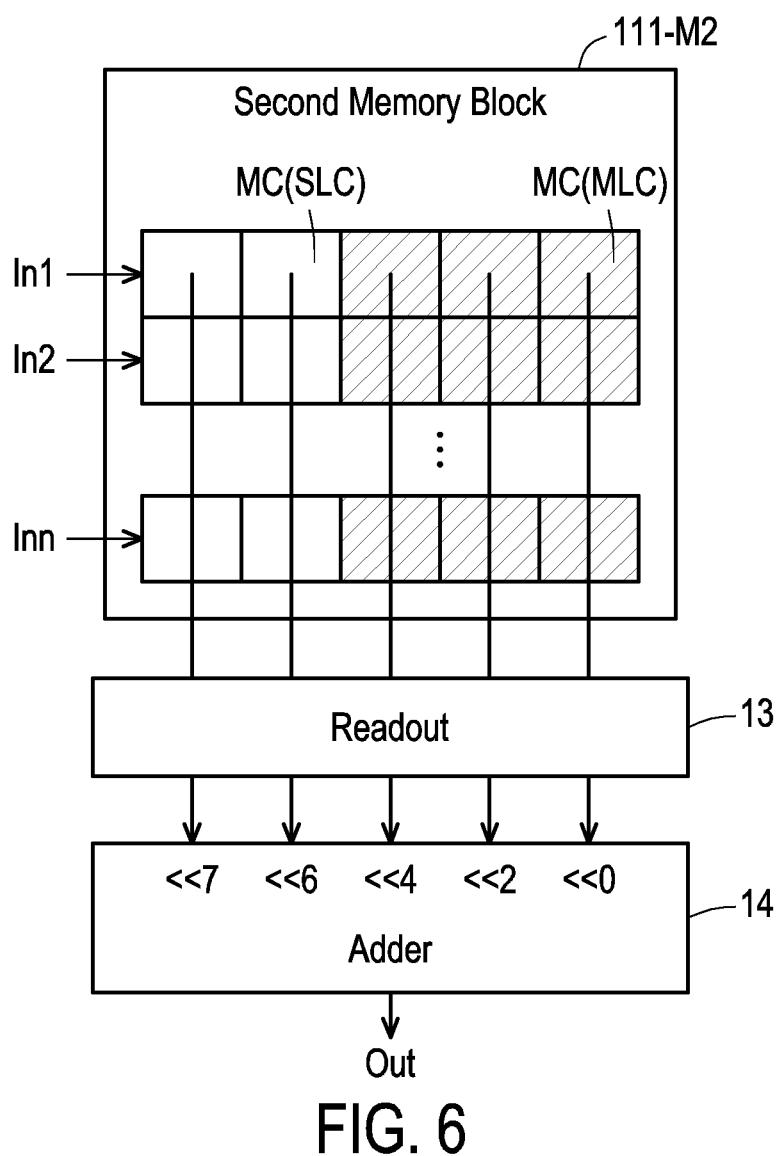
FIG. 6 illustrates a memory configuration to the second memory block when the memory system is operated in the mode in FIG. 4 in accordance with some embodiments.

FIG. 6 illustrates a memory configuration to the second memory block 111-M2 when the memory system 1 is operated in the mode M2 in FIG. 4 in accordance with some embodiments. In FIG. 6, a second memory block 111-M2, a readout circuit 13, and an adder 14 are included in the memory system 1. The second memory block 111-M2, the readout circuit 13, and the adder 14 together are configured to calculate a sum of products of the weight data respectively multiplied by the input data In1-Inn.

Specifically, the memory configuration to the second memory block 111-M2 in FIG. 6 is similar to that in FIG. 5A, except that a column of MLCs in the second memory block 111-M1 is replaced by two columns of SLCs in the second memory block 111-M2. More particularly, the two columns memory cells MC of SLC in the second memory block 111-M2 are configured to store two MSBs of the weight data, and are arranged on the left most two columns in the second memory block 111-M2. Similar to the MAC operation described in relation to FIG. 5A, the input data In1-Inn are respectively provided to the word lines WL of the second memory block 111-M2, letting each memory cells MC to be turned on (conductive) or off (non-conductive), and the electrical characteristics of the memory cells MC on the same bit line BL are accumulated on the corresponding bit line BL. Thus, the readout circuit 13 and the adder 14 may calculate the MAC result of the weight data respectively multiplied by the input data In1-Inn. However, as described in above, the bit location of each second product segment corresponds to the bit location of the weight data stored by the memory cells MC coupled on the corresponding bit line BL. The second product segments received from the two columns of SLCs respectively needs to be left shifted by 6 and 7 bits respectively.

Figure 7:
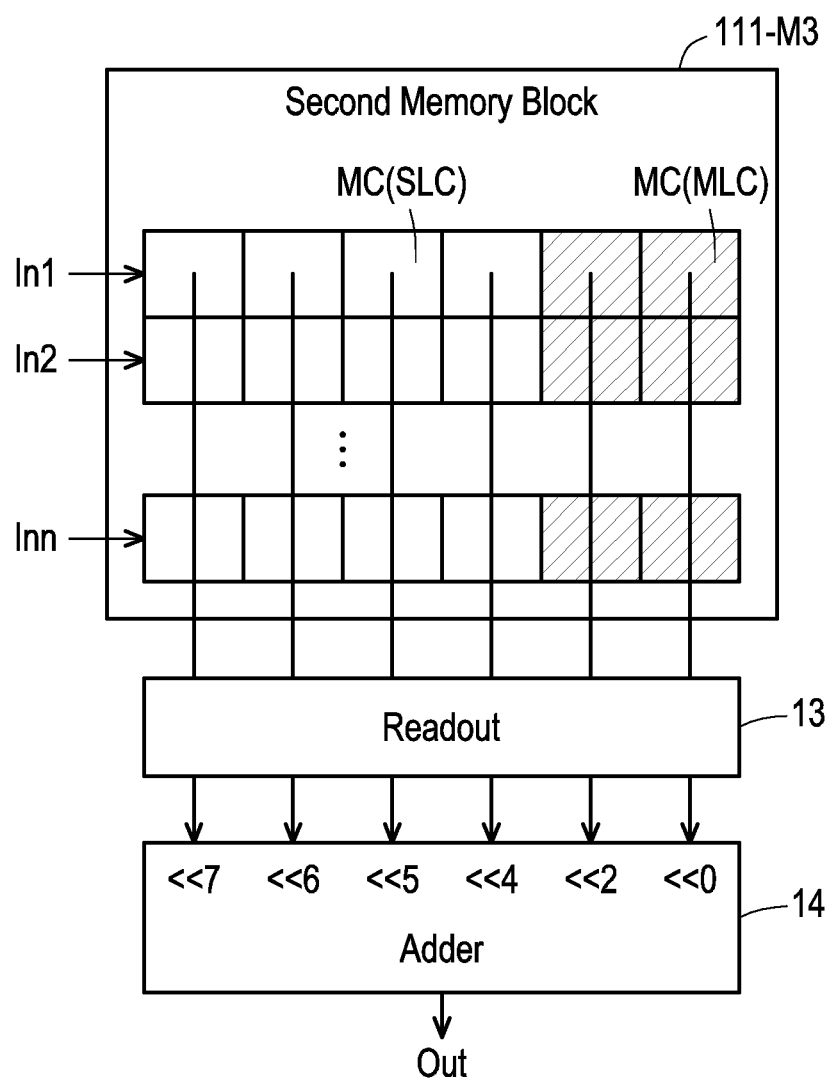
FIG. 7 illustrates a memory configuration to the second memory block when the memory system is operated in the mode in FIG. 4 in accordance with some embodiments.

FIG. 7 illustrates a memory configuration to the second memory block 111-M3 when the memory system 1 is operated in the mode M3 in FIG. 4 in accordance with some embodiments. In FIG. 7, a second memory block 111-M3, a readout circuit 13, and an adder 14 are included in the memory system 1. The second memory block 111-M3, the readout circuit 13, and the adder 14 together are configured to calculate a sum of products of the weight data respectively multiplied by the input data In1-Inn.

Specifically, the memory configuration to the second memory block 111-M3 in FIG. 7 is similar to that in FIG. 5A, except that two columns of MLCs in the second memory block 111-M1 is replaced by four columns of SLCs in the second memory block 111-M3. More particularly, the four columns memory cells MC of SLC in the second memory block 111-M3 are configured to store four MSBs of the weight data, and are arranged at the left most four columns of the second memory block 111-M3. Similar to the MAC operation described in relation to FIG. 5A, the input data In1-Inn are respectively provided to the word lines WL of the second memory block 111-M3, letting each memory cells MC to be turned on (conductive) or off (non-conductive), and the electrical characteristics of the memory cells MC on the same bit line BL are accumulated on the corresponding bit line BL. Thus, the readout circuit 13 and the adder 14 may calculate the sum of products of the weight data respectively multiplied by the input data In1-Inn. However, as described in above, the bit location of each second product segment corresponds to the bit location of the weight data stored by the memory cells MC coupled on the corresponding bit line BL. The second product segments received from the four columns of SLCs respectively needs to be left shifted by 4, 5, 6 and 7 bits respectively.

Figure 8:
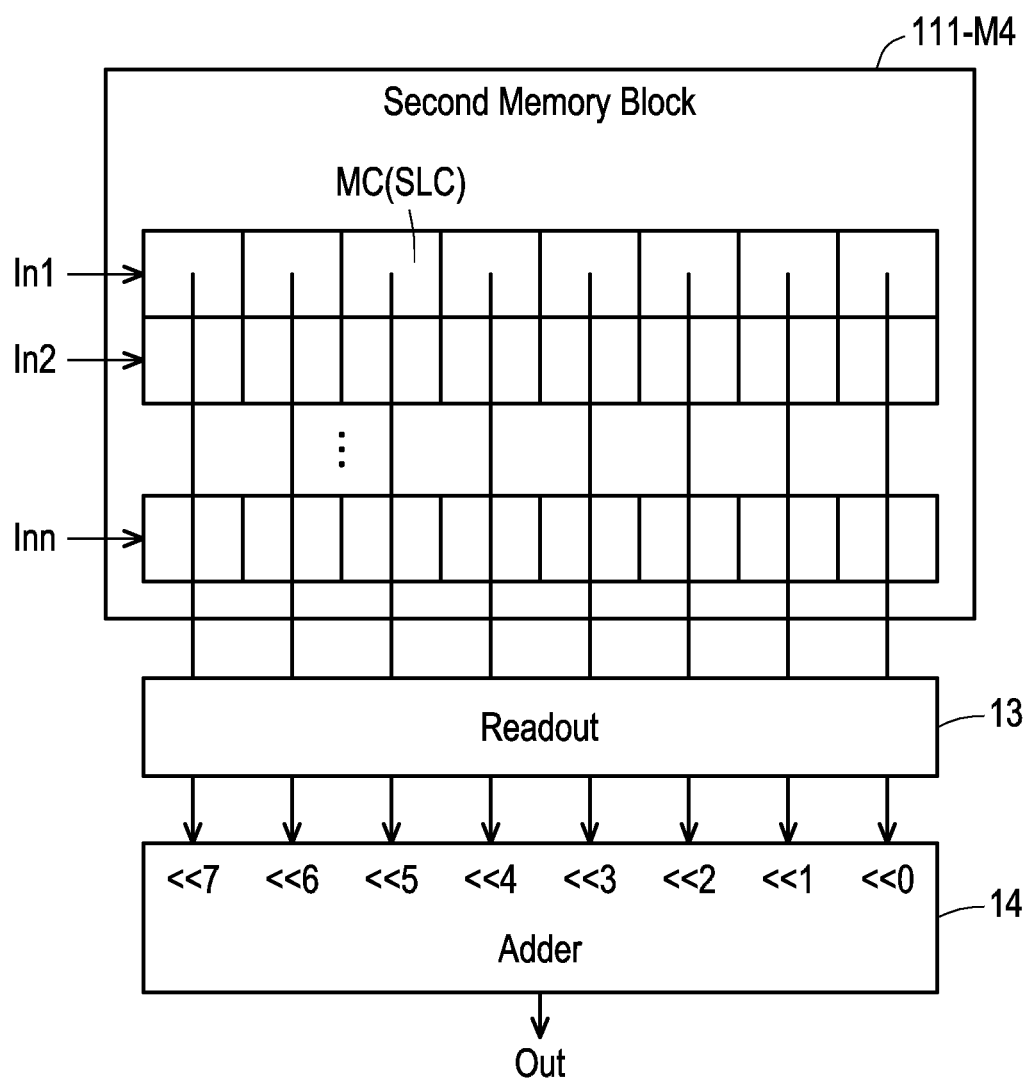
FIG. 8 illustrates a memory configuration to the second memory block when the memory system is operated in the mode in FIG. 4 in accordance with some embodiments.

FIG. 8 illustrates a memory configuration to the second memory block 111-M4 when the memory system 1 is operated in the mode M4 in FIG. 4 in accordance with some embodiments. In FIG. 8, a second memory block 111-M4, a readout circuit 13, and an adder 14 are included in the memory system 1. The second memory block 111-M4, the readout circuit 13, and the adder 14 together are configured to calculate a sum of products of the weight data respectively multiplied by the input data In1-Inn.

Specifically, the memory configuration to the second memory block 111-M4 in FIG. 8 is similar to that in FIG. 5A, except all columns of MLCs in the second memory block 111-M1 are replaced by the SLCs in the second memory block 111-M4. More particularly, the eight columns memory cells MC of SLC in the second memory block 111-M4 are configured to store eight bits of the weight data. Similar to the MAC operation described in relation to FIG. 5A, the input data In1-Inn are respectively provided to the word lines WL of the second memory block 111-M4, letting each memory cells MC to be turned on (conductive) or off (non-conductive), and the electrical characteristics of the memory cells MC on the same bit line BL are accumulated on the corresponding bit line BL. Thus, the readout circuit 13 and the adder 14 may calculate the sum of products of the weight data respectively multiplied by the input data In1-Inn. However, as described in above, the bit location of each second product segment corresponds to the bit location of the weight data stored by the memory cells MC coupled on the corresponding bit line BL. The second product segments received from the SLCs of the eight columns respectively needs to be left shifted by 1 to 7 bits respectively except the second product segment corresponding to the right most column.

Figure 9:
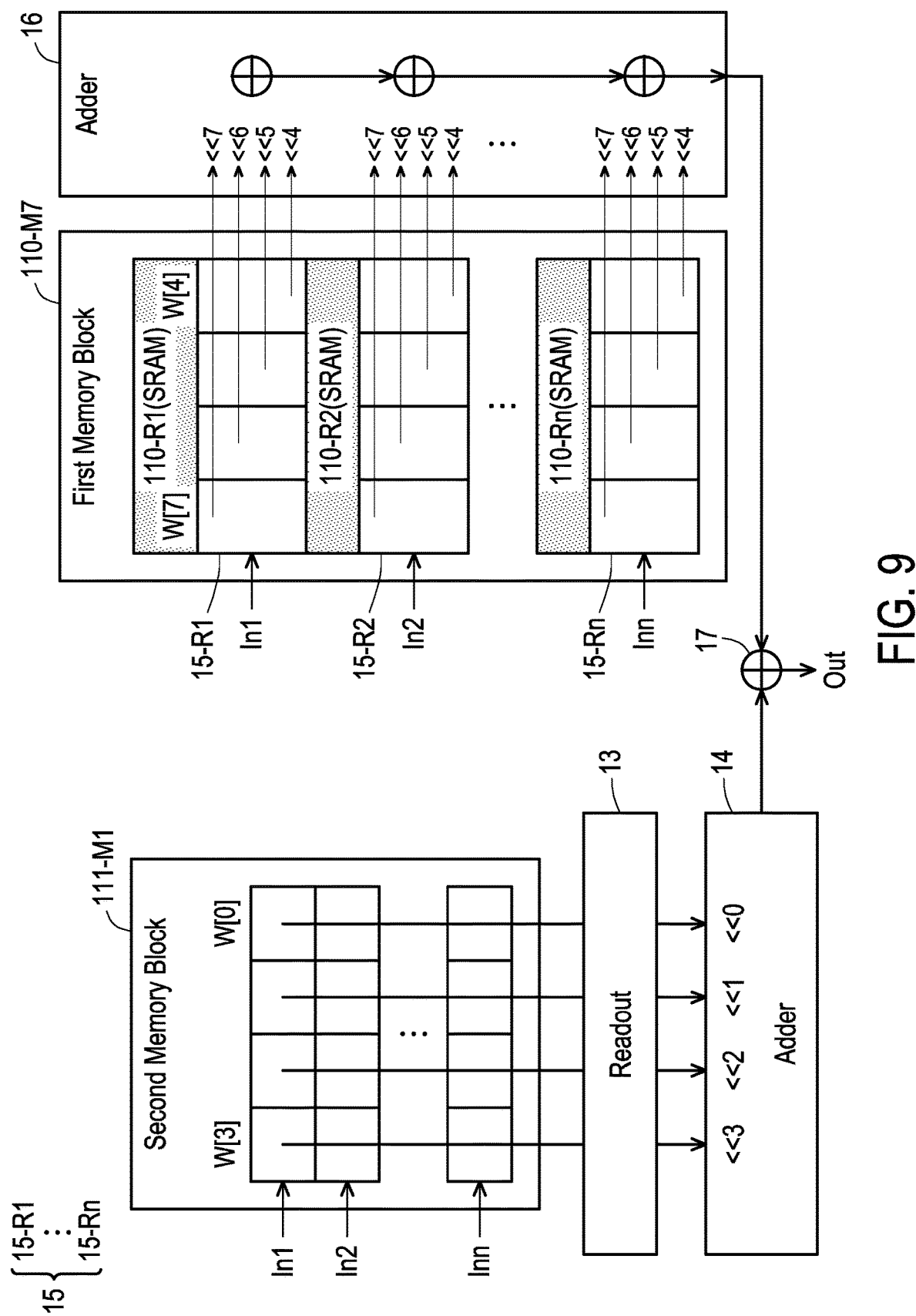
FIG. 9 illustrates a memory configuration to a first memory block and a second memory block when the memory system is operated in the mode in FIG. 4 in accordance with some embodiments.

FIG. 9 illustrates a memory configuration to a first memory block 110-M7 and a second memory block 111-M7 when the memory system 1 is operated in the mode M7 in FIG. 4 in accordance with some embodiments. In FIG. 9, a first memory block 110-M7, a second memory block 111-M7, a readout circuit 13, adders 14, 16, 17 and a computing circuit 15 are included in the memory system 1. The first memory block 110-M7, the second memory block 111-M7, the readout circuit 13, the adders 14, 16, 17 and the computing circuit 15 are configured to calculate a sum of products of the weight data respectively multiplied by the input data In1-Inn.

Specifically, the memory configuration to the second memory block 111-M4 in FIG. 9 is similar to that in FIG. 8, except that only four columns of SLCs are arranged in the second memory block 111-M7 to store four LSBs W[3:0] of the weight data, and the remaining MSBs W[7:4] are stored by the first memory block 110-M7. More particularly, although not clearly illustrated in FIG. 9, an SRAM is a type of semiconductor memory that uses bi-stable latching circuitry (e.g., flip-flop) to store binary bits of information. A typical SRAM cell may include pull-up (PU) transistors, pull-down (PD) transistors, and pass-gate (PG) transistors. As semiconductor technology nodes continue to advance to smaller generations (e.g., smaller than the 10-nanometer node), the SRAM write and read margins may become more important. An alpha ratio of the SRAM—defined as PU's Idsat (saturation current) divided by PG's Idsat—may be tuned to achieve the desired write and/or read margin of the SRAM. Since Idsat is an inverse function of a threshold voltage (Vt), the threshold voltage may be tuned to arrive at the desired Idsat.

The first memory block 110-M7 includes memory rows 110-R1 to 110-Rn. Each memory row is configured to store MSBs W[7:4] of the weight data. The computing circuit 15 includes a plurality of computing rows 15-R1 to 15-Rn respectively disposed adjacent to a corresponding memory row inside the first memory block 110-M7. Each computing row is configured to receive a corresponding input data and access the adjacent memory row, such that each computing row may compute a first product segment of the second data segment multiplied by the received input data. More particularly, the computing row may perform the multiplication of each bit of the first data segment to obtain a plurality of first product segments. Then, the first product segments may be provided to the adder 16 to calculate a first sum after each first product segment is shifted according its corresponding bit position. For example, as shown in FIG. 9, the first product segment calculated by multiplying the MSB of the weight data W[7] by the corresponding input data will be left shifted by 7 bits. Therefore, the first sum calculated by the adder 16 may be provided to another adder 17. The adder 17 is configured to receive the first sum from the adder 16 and the second sum from the adder 14, and the sum of products of the plurality of the weight data respectively multiplied by the input data In1-Inn may be calculated. In other words, multiplications of the first data segments and the second data segments may be handled separately since calculation to the sum of products may be restored properly through proper bit shifts during calculation to the first product segments and the second product segments.

Figure 10:
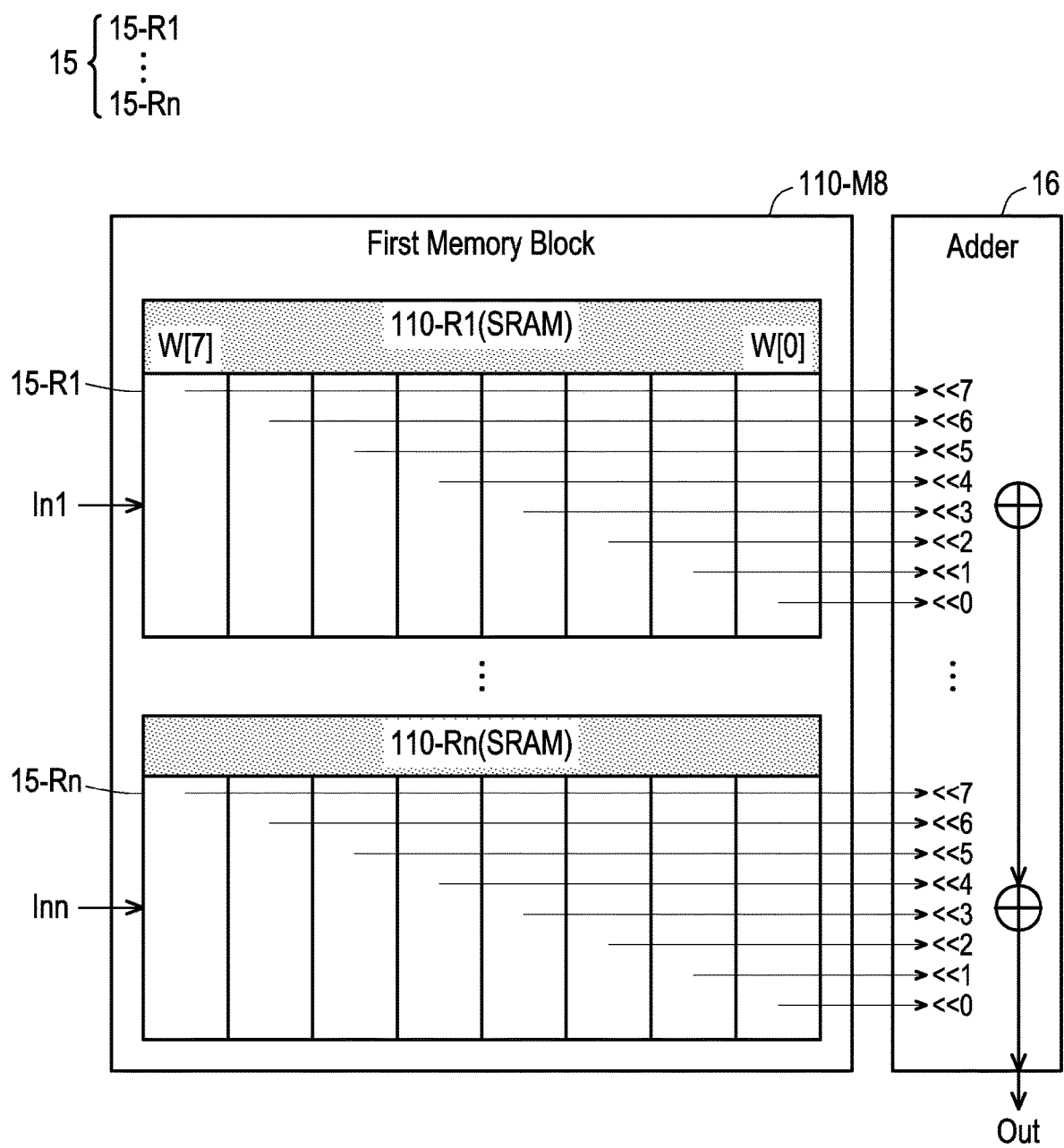
FIG. 10 illustrates a memory configuration to a first memory block when the memory system is operated in the mode M8 in FIG. 4 in accordance with some embodiments.

FIG. 10 illustrates a memory configuration to a first memory block 110-M8 when the memory system 1 is operated in the mode M8 in FIG. 4 in accordance with some embodiments. In FIG. 10, a first memory block 110-M8, a computing circuit 15, and an adder 16 are included in the memory system 1. The first memory block 110-M8, the computing circuit 15, and the adder 16 together are configured to calculate a sum of products of the weight data respectively multiplied by the input data In1-Inn.

The first memory block 110-M8 includes memory rows 110-R1 to 110-Rn. Each memory row is configured to store MSBs W[7:0] of the weight data. The computing circuit 15 includes a plurality of computing rows 15-R1 to 15-Rn respectively disposed adjacent to a corresponding memory row inside the first memory block 110-M8. Each computing row is configured to receive a corresponding input data and access the adjacent memory row, such that each computing row may compute a first product segment of the second data segment multiplied by the received input data. More particularly, the computing row may perform the multiplication bit by bit to obtain a plurality of first product segments. Then, the second product segments may be accumulated by the adder 16 to calculate a first sum after each first product segment is shifted according its corresponding bit position. For example, as shown in FIG. 10, the segment product segment calculated from multiplying the MSB of the weight data W[7] by the corresponding input data will be left shifted by 7 bits. Since the first sum is calculated by using all bits of the weight data, the first sum corresponds to a sum of products of the weight data respectively multiplied by the input data In1-Inn.

Figure 11A:
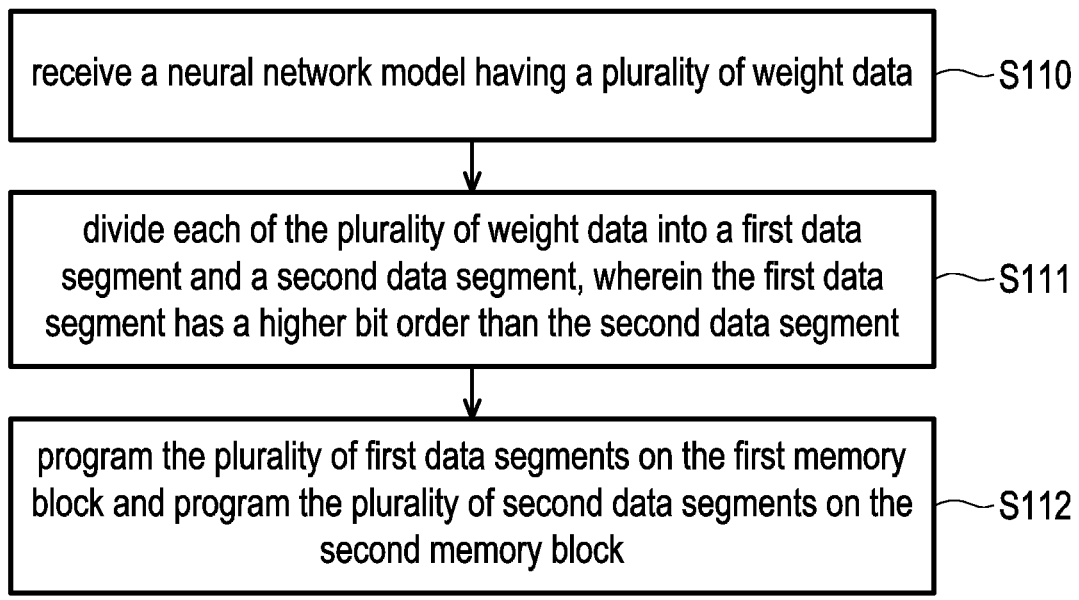
FIG. 11A illustrates an operating method in accordance with some embodiments.

FIG. 11A illustrates an operating method in accordance with some embodiments. The operating method may be applied to the memory system in FIG. 1. The operating method includes steps S110-S112.

In step S110, a neural network model having a plurality of weight data is received. More particularly, the neural network model may include multiple computing layers. Each layer includes multiple neurons coupled to one or more neurons in adjacent layers, and each connection between any two neurons corresponds to multiplication of a weight value. Particularly, once a neuron generates an output value, the generated output value will be provided to the neuron in the next layer after multiplication by the corresponding weight value. As the calculation propagates to the fully connected layer, an output result may be generated by the neural network model NM corresponding to the classification result. By properly training the neural network model NM constituted by the weight values, input data inputted to the neural network model NM may be accurately classified. For example, the neural network model NM is configured to receive the input images Im1-Im3 and generate the output results on identifying whether each of the images Im1-Im3 contains any type of predetermined objects.

In step S111, each of the plurality of weight data is divided into a first data segment and a second data segment, wherein the first data segment has a higher bit order than the second data segment. More particularly, serial bits of each weight data are divided into the first data segment and the second data segment respectively carrying an MSB part and an LSB part of the weight data, so the first product segment has a higher bit order than the second data segment.

In step S112, the plurality of first data segments are programmed on the first memory block and the plurality of second data segments are programmed on the second memory block. More particularly, the first memory block has a longer endurance than the second memory block. In some embodiments, the first memory block is an SRAM, and the second memory block is an NVM. The first data segments corresponding to the MSB parts of the weight data are stored in the first memory block, and the second data segments corresponding to the LSB parts of the weight data are stored in the second memory block.

Further, the memory system may be utilized for calculating a sum of products of the weight data respectively multiplied by a plurality of input data. Since the weight data are divided and stored in the separate first and second memory blocks, the calculation may be taken care separately. Particularly, a computing circuit may be configured to receive a corresponding input data and to access the first data segments from the first memory block. Further, the computing circuit may calculate a plurality of first product segments of the plurality of first data segments respectively multiplied by the input data. A first adder coupled to the computing circuit may be configured to calculate a first sum of the plurality of first product segments after each first product segment is shifted according its corresponding bit position.

As for the second memory block, the plurality of input data may be provided to each row of the second memory block, so electrical characteristics of the memory cells selected by the input data may be accumulated on a plurality of bit lines. A readout circuit may be disposed coupled to the second memory block through the plurality of bit lines, and configured to read a plurality of second product segments respectively from the plurality of bit lines. A second adder disposed coupled to the readout circuit may be configured to calculate a second sum of the plurality of second product segments after each second product segment is shifted according its corresponding bit position.

Figure 11B:
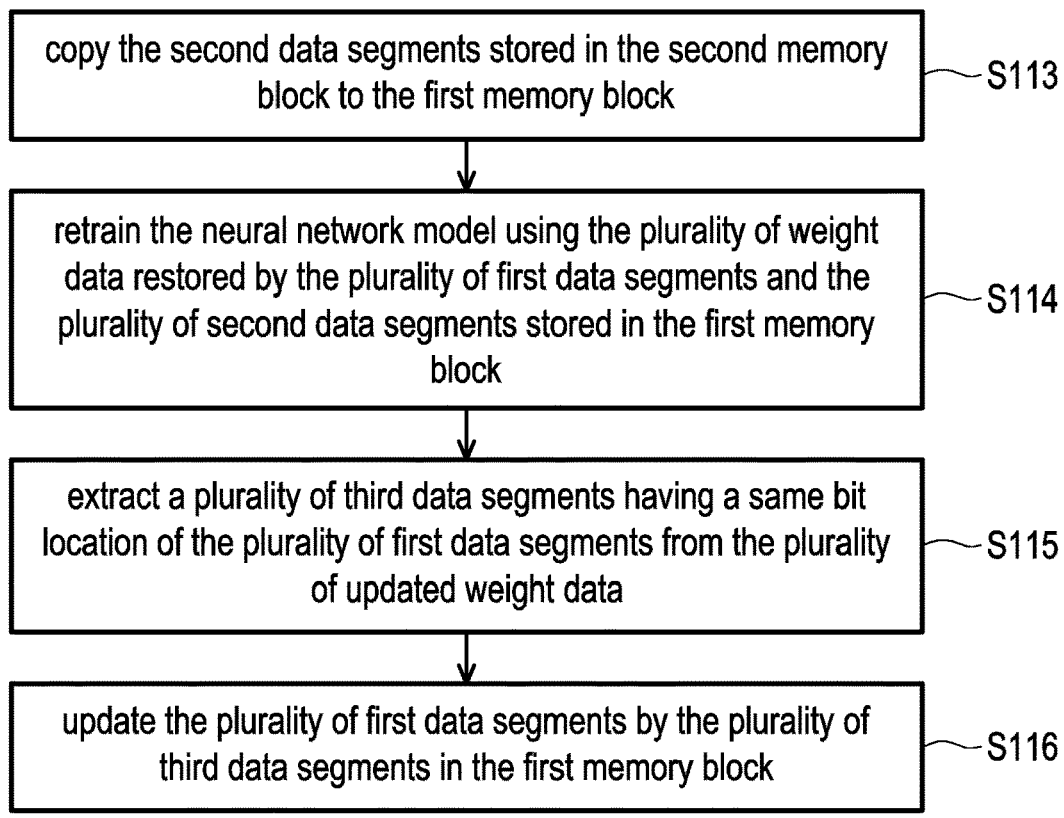
FIG. 11B illustrates an operating method in accordance with some embodiments.

FIG. 11B illustrates an operating method in accordance with some embodiments. The operating method in FIG. 11B may be applied to the memory system in FIG. 1 and performed after the operating method in FIG. 11A. More particularly, the operating method in FIG. 11B may be performed to the memory system 1 in FIG. 1 to retrain and update the neural network model stored in the memory array 11. The operating method includes steps S113-S116.

In step S113, the second data segments stored in the second memory block are copied to the first memory block. Particularly, LSB part of the weight data are transferred to the first memory block.

In step S114, the neural network model is retrained using the plurality of weight data restored by the plurality of first data segments and the plurality of second data segments stored in the first memory block. Particularly, since the second data segments are transferred to the first memory block, both the first and second data segments are stored by the first memory block, and the weight data may be restored on the first memory block. Further, the first memory block may be utilized for retraining the neural network model. During the retraining process, the weight data may be adaptively adjusted according to updated datasets. However, the adjustment made to the weight data during the retraining process may be designed to implement only on the MSB parts of the weight data. Thus, after the retraining, the MSB part of the updated weight data will be adjusted while the LSB part of the updated weight data will stay the same.

In step S115, a plurality of third data segments having a same bit location of the plurality of first data segments are extracted from the plurality of updated weight data. Particularly, since the retraining process only adjusts the MSB part of the weight data, the updated MSB part are extracted from the updated weight data as the third data segments.

In step S116, the plurality of first data segments are updated by the plurality of third data segments in the first memory block. Particularly, the first data segments are replaced by the third data segments, while the second data segments stored by the second memory block are unchanged. The memory system may perform the CiM operation using the third data segments and the second data segments respectively stored in the first memory block and the second memory block, functioning equivalently as the updated neural network model.

More particularly, since the first memory block has a higher endurance than the second memory block, the first memory block has a longer lifetime or a higher program/erase cycle than the second memory block. Under such a circumstance, the memory system stores the first data segments and the second data segments respectively in the first memory block and the second memory block, and only updates the first memory block. Since the values of the weight data are dominated by the MSBs of the first data segments and are more sensitive to changes of the MSB part of the weight data, the adjustment made to the MSBs of the weight data may maintain inference accuracy of the neural network model while also improving the endurance wear out of the second memory block.

Figure 11C:
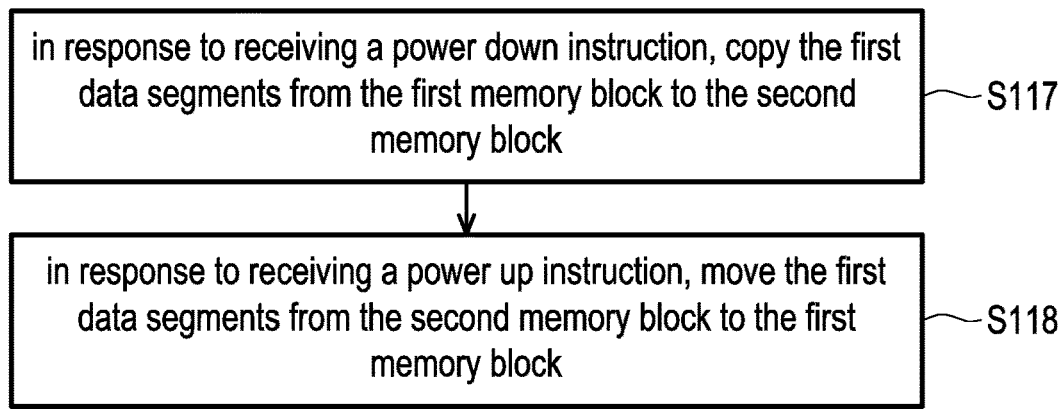
FIG. 11C illustrates an operating method in accordance with some embodiments.

FIG. 11C illustrates an operating method in accordance with some embodiments. The operating method in FIG. 11C may be applied to the memory system in FIG. 1 and performed after the operating method in FIG. 11A. More particularly, the operating method in FIG. 11C may be performed to power up and power down the memory system 1 in FIG. 1. The operating method includes steps S117-S118.

In step S117, in response to receiving a power down instruction, the first data segments are copied from the first memory block to the second memory block. More particularly, when the power down instruction is received, the first data segments will be copied to the second memory block since the second memory block may still preserve data after power is off.

In step S118, in response to receiving a power up instruction, the first data segments are moved from the second memory block to the first memory block. When the memory system is turned, the first data segments stored in the second memory block will be moved back to the first memory block, enabling the memory system to perform the CiM operation with the MSBs of the weight data stored in the first memory block, thereby reducing program/erase cycles of the second memory block.

Figure 12:
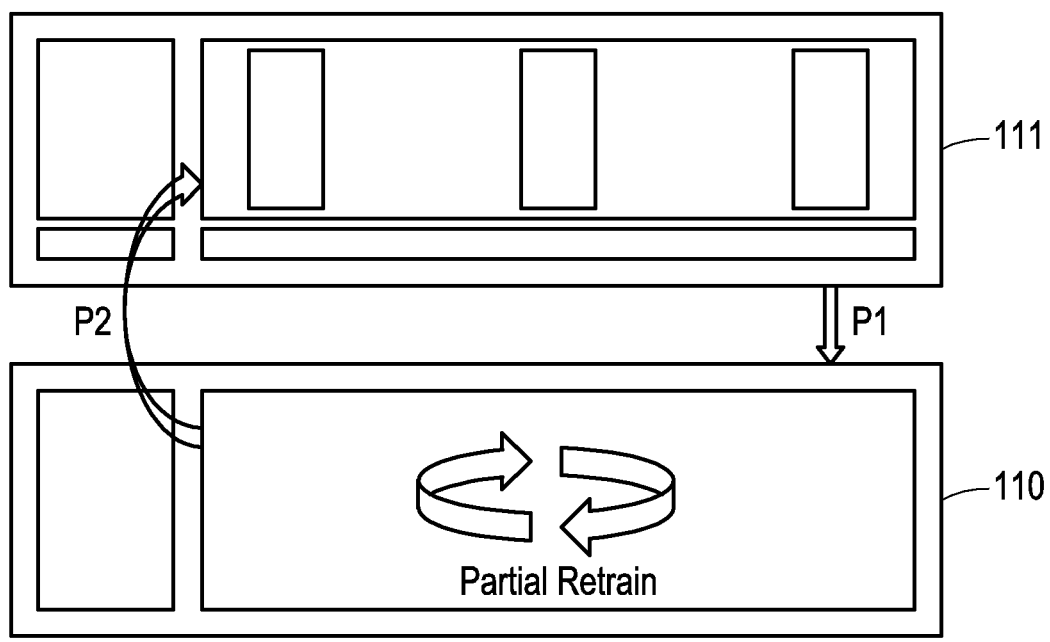
FIG. 12 illustrates an operating process of the first memory block and the second memory block in accordance with some embodiments.

FIG. 12 illustrates an operating process of the first memory block and the second memory block in accordance with some embodiments. The operating process corresponds to operation in FIGS. 11B and 11C.

Particularly, during step S113 in FIG. 11B, the second data segments are copied from the second memory block to the first memory block following a signal path P1 in FIG. 12. After the neural network model is retrained in step S114 and the third data segments are extracted in step S115, the first data segments stored in the first memory block may be accordingly updated while leaving the second data segments stored in the second memory block unchanged.

Further, during step S117 in FIG. 11C, the first data segments are moved from the first memory block to the second memory block following a signal path P2 in FIG. 12. Thus, both the first data segments and second data segments of the weight data may be both preserved by the second memory block during power down. During step S118, the first data segments may be moved from the second memory block to the first memory block, for the memory system to carry out the neural network model using both the first memory block and the second memory block.

In summary, by storing the first data segments with higher bit order in the first memory block having higher endurance, and storing the second data segments with lower bit order in the second memory block having lower endurance, the memory system may improve the inference accuracy of the memory system while simultaneously improving wear out of the memory system.

In accordance with an embodiment, a memory system is for performing a computing-in-memory (CiM) operation. The memory system comprises a memory array and a control circuit. The memory array comprises a first memory block and a second memory block. The first memory block has a longer endurance than the second memory block. The control circuit is configured to: receive a neural network model having a plurality of weight data; divide each of the plurality of weight data into a first data segment and a second data segment. The first data segment has a higher bit order than the second data segment; and program the plurality of first data segments on the first memory block and program the plurality of second data segments on the second memory block.

In accordance with an embodiment, an operating method is for controlling a memory system to perform a computing-in-memory (CiM) operation. The operating method comprises: receiving a neural network model having a plurality of weight data; dividing each of the plurality of weight data into a first data segment and a second data segment. The first data segment has a higher bit order than the second data segment; and programming the plurality of first data segments on a first memory block of a memory array of the memory system and programming the plurality of second data segments on a second memory block of the memory array of the memory system. The first memory block has a longer endurance than the second memory block.

In accordance with an embodiment, a memory system comprises a memory array. The memory array comprises a first memory block storing a plurality of first data segments and a second memory block storing a plurality of second data segments. An operating method is for operating the memory array and comprises: copying the plurality of second data segments from the second memory block to the first memory block; retraining the neural network model using a plurality of weight data restored by the plurality of first data segments and the plurality of second data segments stored in the first memory block; extracting a plurality of third data segments having a same bit location of the plurality of first data segments from the plurality of updated weight data; and updating the plurality of first data segments by the plurality of third data segments in the first memory block.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A memory system for performing a computing-in-memory (CiM) operation, the memory system comprising:
a memory array comprising a first memory block and a second memory block, wherein the first memory block has a longer endurance than the second memory block; and
a control circuit configured to:

receive a neural network model having a plurality of weight data;

divide each of the plurality of weight data into a first data segment and a second data segment, wherein the first data segment has a higher bit order than the second data segment; and program the plurality of first data segments on the first memory block and program the plurality of second data segments on the second memory block.

2. The memory system of claim 1, wherein the first memory block is a static random-access memory (SRAM) and the second memory block is a non-volatile memory (NVM).

3. The memory system of claim 1, wherein lengths of the first data segments and the second data segments are configured by the control circuit, the memory system comprising an interface circuit coupled between the memory array and the control circuit, the interface circuit being configured to select the first memory block and the second memory block out from the memory array according to the lengths of the first and second data segments, and couple the first memory block and the second memory block to the control circuit.

4. The memory system of claim 2, wherein the second memory block comprises a plurality of single-level cells (SLCs) and a plurality of multi-level cells (MLCs).

5. The memory system of claim 1, wherein the control circuit is configured to provide a plurality of input data to the memory array to calculate a sum of products (SOP) of the plurality of weight data respectively multiplied by the plurality of input data.

6. The memory system of claim 5, further comprising:

a computing circuit coupled to the first memory block and configured to generate a plurality of first product segments of the plurality of first data segments respectively multiplied by the input data; and a first adder coupled to the computing circuit and configured to calculate a first sum of the plurality of first product segments after each first product segment is shifted according to its corresponding bit position.

7. The memory system of claim 6, further comprising:

a readout circuit coupled to the second memory block and configured to read a plurality of second product segments respectively from a plurality of columns of the second memory block; and a second adder circuit coupled to the readout circuit and configured to calculate a second sum of the plurality of second product segments after each second product segment is shifted according its corresponding bit position.

8. The memory system of claim 7, wherein the second memory block comprises a plurality of memory cells coupled to a plurality of bit lines, and wherein each bit line is coupled to the memory cells which store bits having the same bit position.

9. The memory system of claim 8, wherein the SOP is calculated by summing the first sum and the second sum.

10. The memory system of claim 1, wherein the control circuit is further configured to:

copy the second data segments stored in the second memory block to the first memory block;

retrain the neural network model using the plurality of weight data restored by the plurality of first data segments and the plurality of second data segments stored in the first memory block;

extract a plurality of third data segments having a same bit location of the plurality of first data segments from the plurality of updated weight data; and update the plurality of first data segments by the plurality of third data segments in the first memory block.

11. The memory system of claim 1, wherein the control circuit is further configured to:

in response to receiving a power down instruction, copy the first data segments from the first memory block to the second memory block; and in response to receiving a power up instruction, move the first data segments from the second memory block to the first memory block.

12. An operating method for controlling a memory system to perform a computing-in-memory (CiM) operation, the operating method comprising:

receiving a neural network model having a plurality of weight data;

dividing each of the plurality of weight data into a first data segment and a second data segment, wherein the first data segment has a higher bit order than the second data segment; and programming the plurality of first data segments on a first memory block of a memory array of the memory system and programming the plurality of second data segments on a second memory block of the memory array of the memory system, wherein the first memory block has a longer endurance than the second memory block.

13. The operating method of claim 12, comprising:

configuring lengths of the first data segments and the second data segments, selecting the first memory block and the second memory block out from the memory array according to the lengths of the first and second data segments.

14. The operating method of claim 12, comprising providing a plurality of input data to the memory array to calculate a sum of products (SOP) of the plurality of weight data respectively multiplied by the plurality of input data.

15. The operating method of claim 14, comprising:

accessing the first memory block to generate a plurality of first product segments of the plurality of first data segments respectively multiplied by the input data; and calculating a first sum of the plurality of first product segments after each first product segment is shifted according to its corresponding bit position.

16. The operating method of claim 15, comprising:

reading a plurality of second product segments respectively from a plurality of columns of the second memory block; and calculating a second sum of the plurality of second product segments after each second product segment is shifted according to its corresponding bit position.

17. The operating method of claim 16, wherein the SOP is calculated by summing the first sum and the second sum.

18. The operating method of claim 12, further comprising:

copying the second data segments stored in the second memory block to the first memory block;

retraining the neural network model by accessing the first data segment and the second data segment stored in the first memory block, to update the plurality of weight data;

extracting a plurality of third data segments having a same bit location of the first data segment from the plurality of updated weight data; and replacing the plurality of first data segments by the plurality of third data segments in the first memory block.

19. The operating method of claim 12, further comprising:
in response to receiving a power down instruction, copying the first data segments from the first memory block to the second memory block; and
in response to receiving a power up instruction, moving the first data segments from the second memory block to the first memory block.

20. An operating method of a memory system comprising a memory array, the memory array comprising a first memory block storing a plurality of first data segments and a second memory block storing a plurality of second data segments, the operating method comprising:
copying the plurality of second data segments from the second memory block to the first memory block;
retraining a neural network model using a plurality of weight data restored by the plurality of first data segments and the plurality of second data segments stored in the first memory block;
extracting a plurality of third data segments having a same bit location of the plurality of first data segments from the plurality of updated weight data; and
updating the plurality of first data segments by the plurality of third data segments in the first memory block.

* * * * *